US010678992B2

(12) United States Patent
Ni et al.

(10) Patent No.: US 10,678,992 B2
(45) Date of Patent: Jun. 9, 2020

(54) AUTOMATICALLY CREATING AT-A-GLANCE CONTENT

(71) Applicant: OATH INC., New York, NY (US)

(72) Inventors: Bin Ni, Fremont, CA (US); Jia Li, Santa Clara, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/418,221

(22) Filed: May 21, 2019

(65) Prior Publication Data

US 2019/0272311 A1 Sep. 5, 2019

Related U.S. Application Data

(63) Continuation of application No. 15/661,105, filed on Jul. 27, 2017, now Pat. No. 10,318,611, which is a continuation of application No. 14/548,852, filed on Nov. 20, 2014, now Pat. No. 9,720,882.

(51) Int. Cl.
*G09G 5/00* (2006.01)
*G06F 40/103* (2020.01)
*G06T 3/40* (2006.01)
*G06F 16/34* (2019.01)

(52) U.S. Cl.
CPC .......... *G06F 40/103* (2020.01); *G06F 16/345* (2019.01); *G06T 3/40* (2013.01)

(58) Field of Classification Search
CPC .............. G08G 2340/0407; G06T 3/40; G09G 2340/0414; G06F 3/0481; G06F 2203/04806

USPC ......................................................... 345/660
See application file for complete search history.

(56) References Cited

U.S. PATENT DOCUMENTS

| 5,212,477 | A | 5/1993 | Indekeu et al. |
| 8,274,529 | B1 * | 9/2012 | Butler ................... G06F 40/154 345/619 |
| 8,954,521 | B1 * | 2/2015 | Faaborg .................. H04L 51/32 709/206 |
| 8,963,960 | B2 * | 2/2015 | Gilra ........................ G09G 5/00 345/619 |
| 9,317,595 | B2 * | 4/2016 | Li .......................... G06F 40/289 |
| 2002/0122596 | A1 | 9/2002 | Bradshaw |
| 2011/0066999 | A1 | 3/2011 | Rabinovich et al. |

OTHER PUBLICATIONS

Android Wear—http://develper.android.com/design/wear/index.html; 2 pages; visited Oct. 1, 2014.

(Continued)

*Primary Examiner* — Gordon G Liu
(74) *Attorney, Agent, or Firm* — James J. DeCarlo; Greenberg Traurig, LLP

(57) ABSTRACT

Generating notifications comprising text and image data for client devices with limited display screens is disclosed. An image to be included in the notification is resized and reshaped using image processing techniques. The resized image is further analyzed to identify optimal portions for placing the text data. The text data can also be analyzed and shortened for including at the identified portion of resized image to generate a notification. The resulting notification displays the text and image data optimally within the limited screen space of the client device so that a user observing the notification can obtain the information at a glance.

20 Claims, 9 Drawing Sheets

(56) References Cited

OTHER PUBLICATIONS

Avidan et al., "Seam Carving for Content-Aware Image Resizing;" 9 pages.
Koumpis et al., "Automatic summarization of voicemail messages using lexical and prosodic features".

* cited by examiner

AUTOMATICALLY CREATING AT-A-GLANCE CONTENT

CROSS REFERENCES TO RELATED APPLICATIONS

This application is a continuation of and claims priority from U.S. patent application Ser. No. 15/661,105, filed Jul. 27, 2017, which claims priority from U.S. patent application Ser. No. 14/548,852, now U.S. Pat. No. 9,720,882, filed on Nov. 20, 2014, which are incorporated herein in their entirety by reference.

BACKGROUND

Rapid developments that occurred in mobile data networks and content providing devices have made available numerous information sources to users. Different types of content items such as text, audio, video or combinations thereof are provided to the users at their various devices. Content providing devices not only include mobile devices like tablet devices and smartphones but also include wearable devices such as eye glasses or smart watches.

SUMMARY

This disclosure relates to systems and methods for formatting content for display on devices with limited screen sizes such as smartwatches. As numerous content containing messages are sent to such devices over networks, and with content volumes expected to increase expected to increase exponentially as smart watch adoption increases, the formatting of content and/or messages becomes impossible without robust automated techniques to handle the millions of daily content interactions between content providers and smart watch users.

A method of generating a notification for a client device is disclosed in one embodiment. The method comprises receiving, by a processor, an image to be forwarded to a client device of a user and text data associated with the image. The processor resizes the image using, for example, seam carving techniques. The textual content to be forwarded to the client device with the resized image is determined by the processor, by comparing the length of the text data with a predetermined threshold length. The method further comprises identifying, by the processor, at least one location within the resized image for placing the textual content. A notification comprising the resized image and the textual content positioned at the location is produced and transmitted by the processor for display at the client device.

In some embodiments, the method of resizing the image further comprises, accessing, by the processor, a database comprising specifications of the client device and obtaining, the screen size of the client device. The image is resized based on a screen size of the client device. In some embodiments, if it is determined that the length of the text data is greater than the threshold length a summary of the text data is generated using natural language processing techniques. The summary is identified as the textual content to be forwarded to the client device with the notification. If it is determined that the length of the text data is less than the threshold length, the text data is identified as the textual content to be forwarded to the client device with the notification.

In some embodiments, the method of identifying a location within the resized image for placing the textual content further comprises, identifying, by the processor using image processing techniques, significant elements of the resized image and their positions within the resized image. In some embodiments, the method of identifying the at least one location within the resized image further comprises categorizing, by the processor, the resized image into one or more content categories based on the significant elements. In some embodiments training data is provided, by the processor to a classifier to train the classifier for categorizing images into the one or more content categories. The at least one location within the resized image is identified based on the content categories of the image and the positions of the significant elements within the received image. In some embodiments, the at least one location is a center of the resized image for content categories that include generic images in notifications.

A computing device comprising a processor and a storage medium for tangibly storing thereon program logic for execution by the processor is disclosed in some embodiments. In some embodiments, the programming logic comprises image receiving logic, executed by the processor, for receiving an image to be forwarded to a client device of a user. Text retrieving logic, is executed by the processor, for retrieving text data associated with the image. Resizing logic, executed by the processor, resizes the image based on a screen size of the client device. The textual content to be forwarded to the client device with the resized image is determined by the processor by executing determining logic. Identifying logic, is executed by the processor, for identifying at least one location within the resized image for placing the textual content. A notification comprising the resized image and the summary positioned at the location is produced by the producing logic and the notification is transmitted for display at the client device via the transmitting logic executed by the processor.

In some embodiments, the resizing logic further comprises, accessing logic, executed by the processor, for accessing a database comprising specifications of the client device and obtaining logic, executed by the processor, for obtaining the screen size of the client device.

In some embodiments, the programming logic comprises image receiving logic, executed by the processor, for receiving an image to be forwarded to a client device of a user. Text retrieving logic, is executed by the processor, for retrieving text data associated with the image. Resizing logic, executed by the processor, resizes the image based on a screen size of the client device. The textual content to be forwarded to the client device with the resized image is determined by the processor by executing determining logic. Identifying logic, is executed by the processor, for identifying at least one location within the resized image for placing the textual content. A notification comprising the resized image and the summary positioned at the location is produced by the producing logic and the notification is transmitted for display at the client device via the transmitting logic executed by the processor.

In some embodiments, the identifying logic further comprises element identifying logic, executed by the processor, for identifying using image processing techniques, significant elements of the resized image. Position identifying logic is also executed by the processor for identifying positions of the significant elements within the resized image. Categorizing logic, is executed by the processor, for categorizing the resized image into one or more content categories based on the significant elements. In some embodiments, the identifying logic further comprises logic for identifying at least one location within the resized image for the placement of the summary based on the content categories of the image and the positions of the significant elements within the received image.

In some embodiments, the determining logic further comprises comparing logic, executed by the processor, for comparing the text data with a predetermine threshold length. Generating logic, is executed by the processor, for generating a summary of the text data if a length of the text data is greater than the threshold length. The summary is identified as the textual content to be forwarded to the client device with the notification by the content identifying logic, executed by the processor. In some embodiments, the content identifying logic further comprises logic for identifying the text data as the textual content to be forwarded to the client device with the notification if a length of the text data is less than the threshold length.

A computer readable storage medium comprising processor-executable instructions is disclosed in an embodiment. The processor-executable instructions include instructions for receiving an image to be forwarded to a client device of a user and for retrieving the text data associated with the image. The storage medium includes instructions for resizing the image based on a screen size of the client device are included in the computer readable storage medium. Further instructions for identifying textual content to be forwarded to the client device with the resized image are also included in the storage medium. In some embodiments, the instructions further comprise instructions for identifying at least one location within the resized image for placing the textual content, producing a notification comprising the resized image and the textual content positioned at the location and for transmitting the notification for display at the client device.

In some embodiments, the instructions for resizing the image further comprise instructions for accessing a database comprising specifications of the client device and obtaining the screen size of the client device. In some embodiments instructions for resizing the image further comprise instructions for using seam carving techniques.

In some embodiments, the computer readable medium further comprises instructions for identifying, using image processing techniques, significant elements of the resized image and positions of the significant elements within the resized image. In some embodiments, the instructions for determining the at least one location within the resized image further comprise instructions for determining the at least one location within the resized image for the placement of the summary based on the content categories of the image and the positions of the significant elements within the received image.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
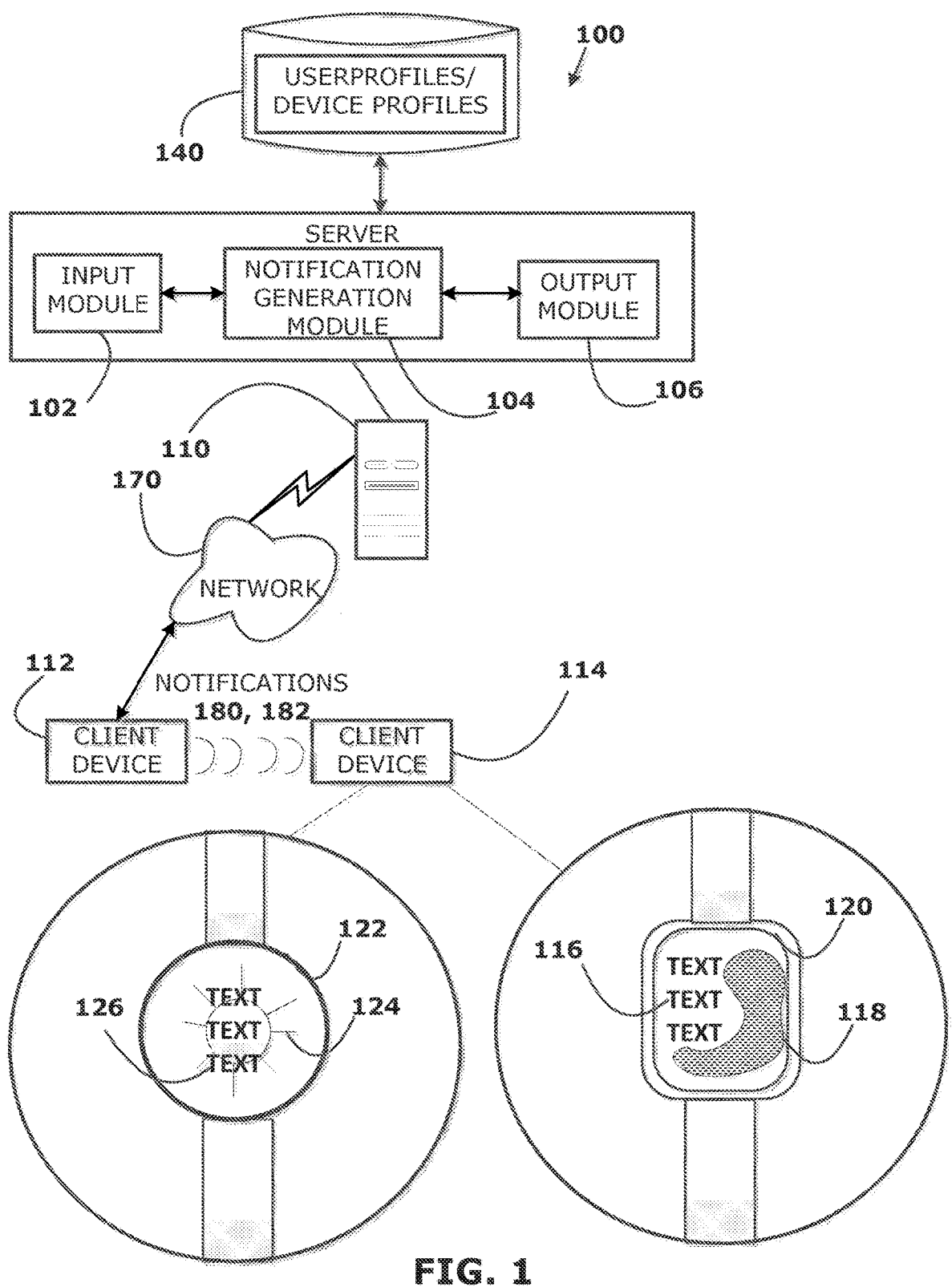
FIG. 1 illustrates a communication system configured to transmit notifications in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The ubiquity of mobile networks and miniaturization of computing devices led to the development of wearable content-providing devices such as, virtual reality glasses, augmented reality glasses, smartwatches and the like. Smartwatches allow applications to deliver notifications to the users on the face of the watch. The notifications generally comprise a background image and a title. The notifications delivered, for example via ANDROID wear content stream, display the title or textual content of the notification on a solid white background overlaid at a fixed position on the image. In many instances, solid background of the textual content can obscure the image thereby degrading the user experience. This situation is further exacerbated by the fact that such notifications form a primary communication tool for smartwatches.

Turning now to the figures, FIG. 1 illustrates a communication system 100 that comprises a sever 110 that is configured to transmit notifications in accordance with some embodiments. The server 110 comprises an input module 102 that receives input related to generating the notifications. Notifications can be generated by the server 110 for a variety of events such as but not limited to, breaking news alerts, stock alerts, sports scores, weather updates, communication alerts such as emails, SMS or (Short Message Service), instant messages, advertisements, or other notifications from information sources that users may have subscribed to receive. In some embodiments, the information received by the input module 102 comprises one or more images and text to be included in the notification.

A notification generation module 104 comprised on the server 110 generates notifications that deliver information to the user at-a-glance in accordance with embodiments described herein. The notifications thus produced comprising an arbitrary or selected image and a title, message or caption are presented on the screen of a client device such as a smartwatch, within a limited space effectively so that the user can grasp the information just by glancing at it. In some embodiments, the notifications can include a single screen of display comprising one image with inlaid text or the notifications can comprise a plurality of screens each with an image and its associated text included therein. When the user receives such a notification, with a plurality of screens, the users will be able to flip or swipe or otherwise navigate in accordance with device capabilities through the various screens. Embodiments disclosed herein leverage computer vision and natural language processing technology to identify an optimal position within the image and the optimal geometry perspective to merge the title automatically. The notifications thus generated are transmitted to the client devices by the output module 106.

The server 110 transmits the notifications for display to the client device 112 via the network 170. The network 170 can comprise without limitation, WAN, LAN, wire-line type connections, wireless type connections, cellular network such as 2G, 3G, 4G or any combination thereof. Moreover, the client device 112 can be without limitation, a laptop, a desktop, a tablet device, a smartphone or a wearable computing and communication device such as a pair of glasses or a smartwatch. In some embodiments, the output module 106 can obtain information regarding the client devices 112, 114 from user profiles (not shown) stored on a processor-readable storage medium 140. It may be appreciated that the storage medium 140 can be a processor-readable storage medium that has one or more databases stored thereon in accordance with embodiments described herein.

In some embodiments, a notification 180 received for display at the client device 112 such as a smartphone can be transmitted to a second client device 114 such as a smartwatch via, for example, a Bluetooth network. It may be appreciated that while the smartwatch 114 is shown as being coupled to the network 170 via the client device 112, this is only by the way of illustration and does not limit the subject matter described herein in any manner. As better communication technologies and more powerful transceivers evolve, the smartwatch 114 can be directly coupled to the network 170 without an intermediary such as the client device 112. Notifications transmitted by the server 110 are therefore formatted for display on particular devices so that the images and text are optimally displayed within limited screen real estate.

As discussed supra, notifications formatted for display on smartwatches comprise an image and a brief message comprising a number of words positioned within the image, as the display real estate of smartwatches tends to be very limited. Notifications generated by technologies for mobile operating environments such as, for example the ANDROID™ content stream, include the text on a solid white background superimposed on the image. As a result, certain portions of the image can get obscured because of the white background of the text. This can adversely affect user experience as the users may not have the control to move the text portion to view interesting portions of the image. The notification generation module 104 therefore configures notifications 180, 182 for smartwatches that provide an improved user experience. More particularly, the notification generation module 104 comprises processor readable instructions to classify notifications and based on the type of notifications, determines a placement position within the image for the text when generating the notification.

Two insets are included in FIG. 1 showing the details of the notifications 180, 182 generated by the notification generation module 104 based on the category of the notifications in accordance with some embodiments. For example, the notification 180 delivers breaking news and it comprises a background image 120 shaped to suit the face of the smartwatch 114 with text 116 comprised therein. Placement of text 116 on a solid, colored background that obscures significant elements 118 of the background image 120 would degrade user experience. Therefore, the notification generation module 104 generates the notification 180 wherein the text 116 is arranged so that it does not obscure the significant element(s) 118 of the background image 120.

In some embodiments, the significant elements of the image can comprise those portions of the image that convey important visual information. Accordingly, an image can comprise more than one significant element in some embodiments. By the way of illustration and not limitation, the significant element of a portrait would be the person or the being pictured therein or the significant elements of scenery comprising a sunset over the sea would be the sun and the sea. Although illustrated as a single element, it may be appreciated that the significant element 118 of the background image 120 can comprise multiple entities. By the way of illustration and not limitation, more than one person may form the significant element 118.

In some embodiments, the notification 182 can be related to weather alerts. As discussed herein, placement of the text 126 on a solid, colored background would occlude the significant element 124 of the background image 122. The notification generation module 104 therefore configures the notification 182 so that the text 126 is overlaid on the background image 122 with a transparent background so that the significant element 124 is not occluded by the text 126. Hence, the notification generation module 104 is configured to generate notifications 180, 182 for smartwatches based for example, on their content categories so that the images and text within the notifications are clearly visible to a user thereby improving the user experience with smartwatches.

It may be appreciated that although the techniques are discussed herein with reference to user devices such as smartwatches this is only by the way of illustration and not limitation. The embodiments discussed herein can be applied within a computing system or methodology wherein optimal locations within images for placement of text data need to be identified so that the overlaid or co-positioned text does not obscure or occlude the significant image elements.

Figure 2:
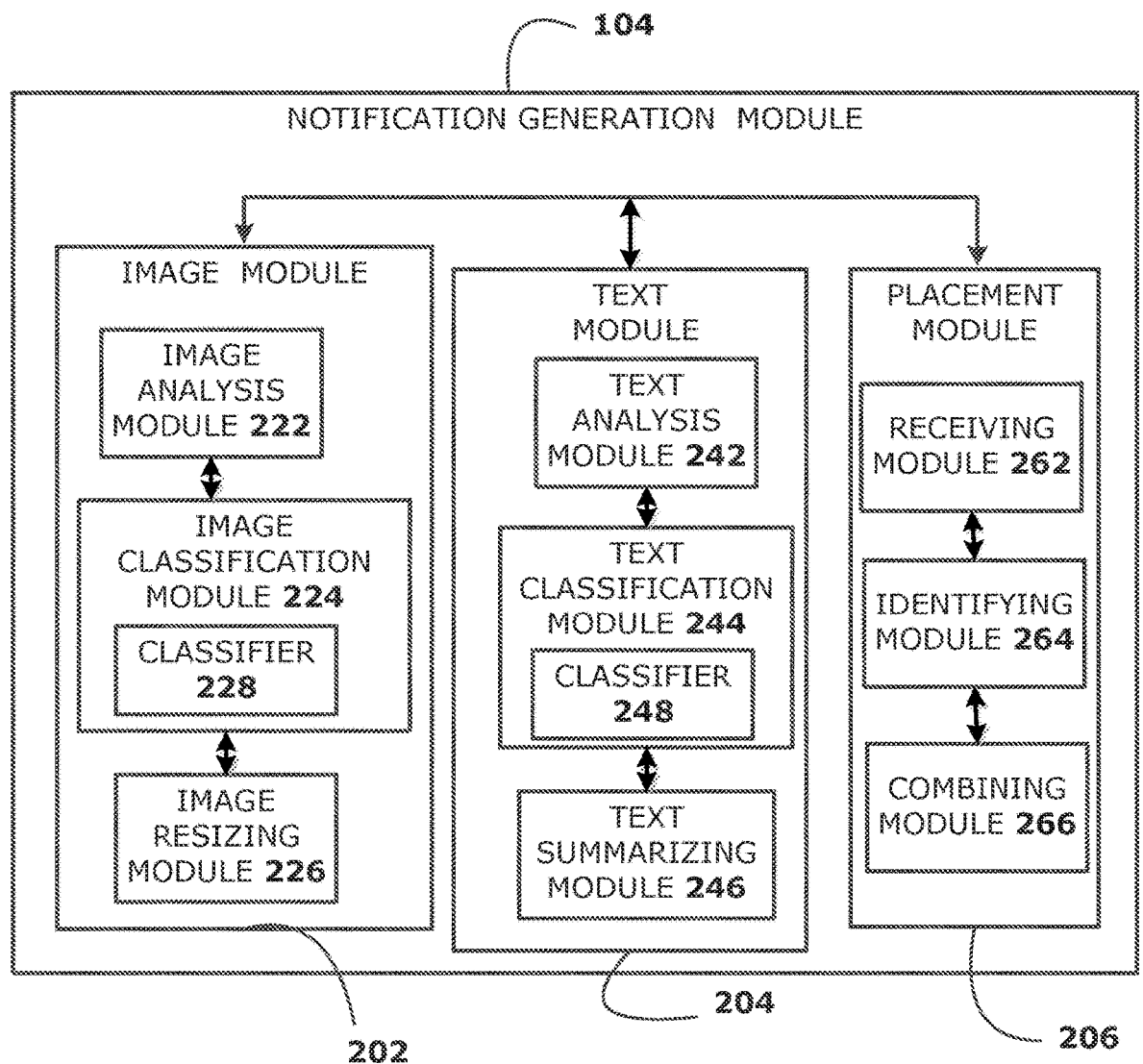
FIG. 2 is a schematic diagram of the notification generation module in accordance with some embodiments.

FIG. 2 is a schematic diagram of the notification generation module 104 in accordance with some embodiments. The notification generation module 104 comprises an image module 202, a text module 204 and a placement module 208. The image module 202 further comprises an image analysis module 222, an image classification module 224 and an image resizing module 226. As discussed supra, the notification 182 comprises a background image 122 and text 126. When information for generating the notification is received, the image module 202 analyzes the background image 122 to be associated with the notification to classify the image 122 under one or more content categories, and to identify image attributes such as but not limited to the significant elements 124, their colors and positions within the image 122. The image module 202 further resizes the image 122 based on one or more of user and device profiles retrieved from the storage medium 140 so that the final notification 182 can be optimally displayed on the smartwatch 114.

In some embodiments, the image analysis module 222 employs computer vision technology such as deep learning framework to analyze the image 122 to determine the various attributes of the image 122. By the way of illustration and not limitation, the attributes of the image 122 determined by the image analysis module 222 can comprise at least the significant elements 124 of the image 122, their colors which can include RGB values of the image pixels and their positions within the image 122. The placement of the significant elements 124 within the image 122 can further enable the image analysis module 222 to identify whitespaces within the image 122 for placing the title or textual content 126.

The information regarding the significant elements 124 is further employed by the image classification module 224 to sort the image 122 into one or more content categories. For example, based on the significant element 126 of the image 122 being an image of the sun, the image classification module 224 can classify the image 122 into one or more of the weather, science, nature, environment or other related categories. In some embodiments, a classifier 228 comprised in the image classification module 224 uses computer vision technology such as deep learning framework to categorize/annotate the images. The classifier 228 can be trained via providing large scale training data to identify the various content categories associated with the images. For example, training data comprising more than 2200 categories can be provided to the classifier 228 to understand concepts related to a given image. Thus, upon receiving an image, the classifier 228 is configured to sort it into one or more categories and/or sub-categories based on the training data that was provided to it. In some embodiments, the placement of the title or textual content within the image 122 can depend on the content category of the image 122 as detailed further herein.

The image resizing module 224 resizes the image 122 to fit within the screen of the client device 114. In some embodiments, the image resizing module 224 can access user profile data to determine the identifying indicia of the client device 114 such as the make/model number. In some embodiments wherein notifications are pushed by the server 110, the user initially registers to receive notifications from an information source and hence provides details regarding the client device at which the notifications are to be received. Such user data can be stored in the user profiles on the data storage medium 140.

In some embodiments, wherein notifications are pulled from the server 110 by a client device, a request for notifications received at the server 110 can be analyzed to obtain the identifying indicia of a requesting client device. Based on the identifying indicia of the client device 114, its associated attributes such as the screen size and shape are obtained from a separate device profile database stored on the processor-readable storage medium 140. The image resizing module 224 can resize the image 122 to suit the client device 114 via techniques such as but not limited to, seam carving that facilitate content aware image resizing so that images can be displayed without distortion on a variety of devices.

The text module 204 is configured to analyze the text 126 of a notification 182 to classify the text under one or more content categories and to summarize the text if needed. A text analysis module 242 can analyze the text associated with a notification. The text analysis module 242 can be configured to obtain the various attributes of the text including but not limited to its total length, parts of speech of the words, identifying stop words that can be removed. The attributes of the textual content as determined by the text analysis module 242 are transmitted to the text classification module 244 and the text summarizing module 246. Various classification techniques know in the art or to be invented can be employed by the text classification module 244 to identify one or more content categories associated with the text 126. A classifier 248 included in the text classification module 244, can be trained to identify one or more content categories for classifying the textual content 126.

Based on the attributes of the text received from the text analysis module 242, a text summarizing module 246 determines if the text to be included a notification should be summarized. In some embodiments, the text summarizing module 246 can be configured to compare the text to be included into the notifications with a predetermined threshold length that may be standardized across client devices, such as the smart watches. In some embodiment, a plurality of predetermined threshold lengths can be associated with each of the content categories. For example, notifications associated with content categories such as the weather reports, sport score updates or stock alerts, alarms and the like comprising brief textual content such as a few numbers, letters or alpha-numeric characters may not be required to be shortened or summarized. In this case, the text is transmitted for placement within or proximate an image without any changes. In categories such as breaking news stories, the textual content is generally longer and a notification may need to be generated summarizing an article that extends to a few sentences or even multiple paragraphs. Accordingly, the text summarizing module 246 employs natural language processing techniques generally known in the art to summarize the text to create a title for the notification.

The resized image from the image module 202 and the text to be included in the notification are obtained by the receiving module 262 which is comprised in the placement module 206. The identifying module 264, also comprised within the placement module 206, identifies an area within the resized image for including the text. The information obtained from the image analysis module 222 and the image classification module 224 enables the identifying module 264 to determine the location for the text in accordance with some embodiments. If the received image is classified under one or more of weather alerts, sports scores or stock updates, the identifying module 264 can be configured to automatically indicate a central portion of the image as the placement area for the text. For example, when generating a weather notification 182, the identifying module 264 can indicate the central portion of the image 122 as a location for placing textual content 126.

On the other hand, if the notification to be generated is related to a content category such as breaking news, the identifying module 264 can be configured to identify the location(s) of the significant element(s) within the resized image. Based on the locations of the significant elements within the resized image, the identification module 264 can be further configured to indicate an area for including the text of the notification. In some embodiments, the identification module 264 can comprise instructions that indicate areas of the resized image other than areas occupied by the significant image elements for placement of the text data. This is because the important information regarding the news item may be conveyed via both the text and the image. Hence, it is desirable that the image be made visible to the user to the extent permitted by the screen size constraints of client devices such the smartwatch 114. Based on the information regarding the portions of the image occupied by the significant elements as obtained from the image analysis module 242, the identifying module 264 identifies portions of the image wherein the text can be inserted.

The information regarding the identified area is communicated to the combining module 266 for the generation of the notification. The combining module 266 also receives the resized image from the image module 202, the text to be included in the notification from the text module 204. Based on the information from the identifying module 264, the combining module 266 places the text at the portions within the resized and re-shaped image identified by the identifying module 264 in order to generate the notification. For example, as described supra, the identifying module 264 identifies the central portion of the background image 122 for the placement of the text 126. Accordingly, the combining module 266 generates the notification 182 by placing the text 126 at the center of the image 122.

In another example, the image analysis module 222 identifies the areas occupied by the significant elements 118 of the image 120 for generating a notification 180. Accordingly, the identifying module 264 identifies remaining area of the image 120 outside of the significant image elements 118 for the placement of the text 116. Thus, the combining module 266 generates the notification 180 by placing the text 116 on one side of the image 120 away from the significant image elements 118. The significant image elements 118 are hence not obscured by the text 116 and the entire information within the notification 180 is optimally conveyed to the user at a glance within the limited space of a smartwatch screen.

Figure 3:
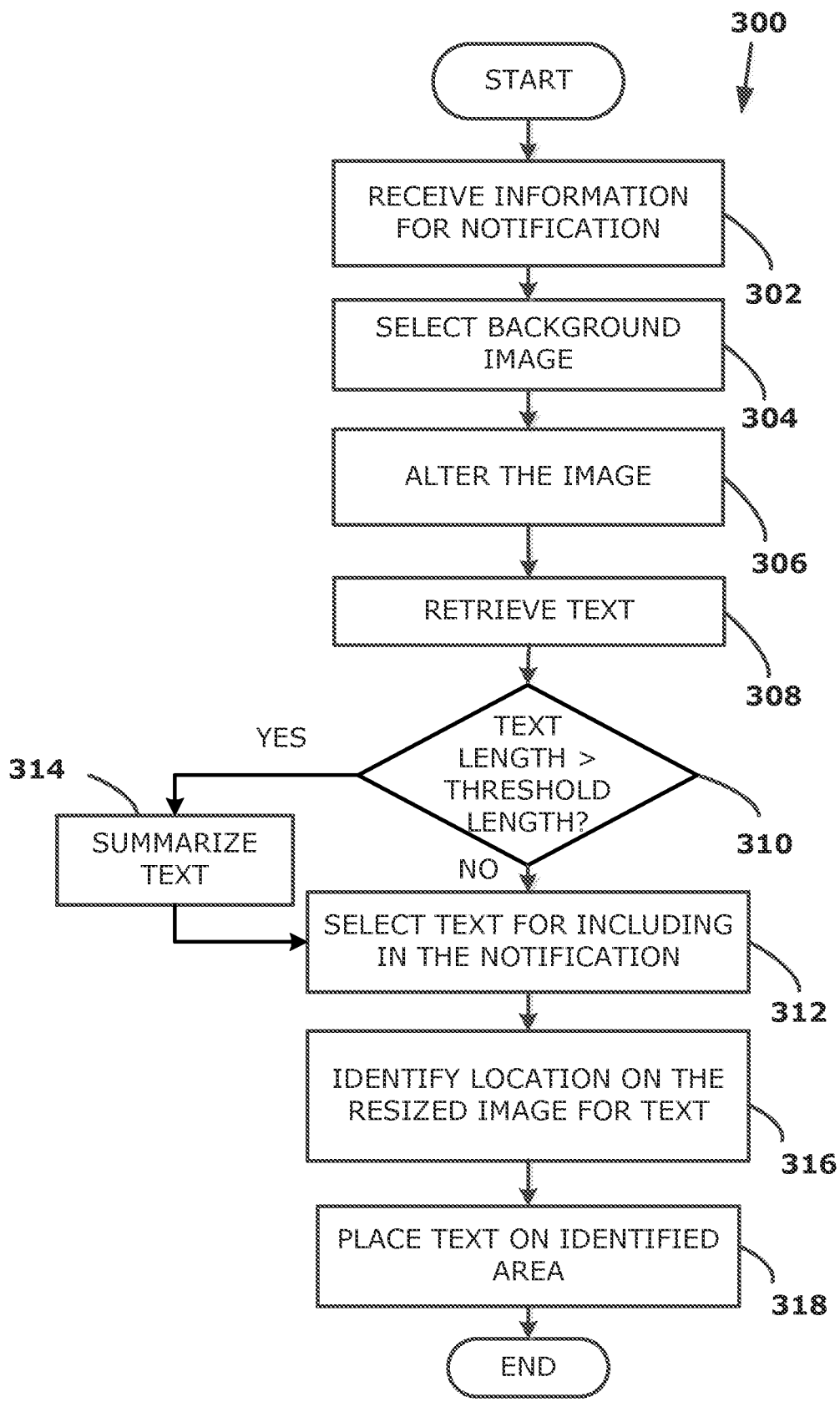
FIG. 3 is a flowchart that illustrates a method of generating a notification for client devices in accordance with embodiments described herein.

FIG. 3 is a flowchart 300 that illustrates a method of generating a notification for client devices such as smartwatches in accordance with embodiments described herein. The method begins at 302 wherein information is received for generating a notification. The information can comprise but is not limited to, breaking news, weather updates, sports scores, stock updates, status updates from communication systems such as emails, SMS and/or social networks. The received information can include textual content and one or more background images.

At 304, a background image is automatically selected for generation of a notification to convey the information to a client device 114 such as a smartwatch. In some embodiments, the information received at 302 can include an image which is selected at 304. In some embodiments, the information received at 302 can include a plurality of images which are conveyed to the client device 114 via a corresponding plurality of screens that a user can flip through. Hence, all the images obtained at 302 are selected at 304. In some embodiments, the information received at 302 can comprise only text data. In this case, based on the classification of the text data, a default background image can be selected at 304 to be presented with the received text data in a notification.

At 306, the selected image is altered or re-shaped to fit the client device 114. As described supra, information regarding the client device 114 can be obtained for example, via information from one or more of the user profiles and device profiles saved to the storage medium 140. Based on the device specifications obtained from the device profile database, the image can be resized and/or reshaped to be included in a notification. In addition, the shape of the selected image can be changed at 306 to suit the face of the client device 114. Various shapes such as but not limited to circle, elliptical, square, rectangular or other polygonal or irregular shapes can be selected for the background image of the notification based on the shape of the device screen receiving the notification.

At 308, the text to be included in the notification is retrieved from the received event information in accordance with embodiments described herein. In some embodiments, wherein notifications are generated for events such as breaking news or for notifications related to communication system updates such as emails or social networks, a portion of the text received in the event information such as but not limited to the main title and one or more sub-headings can be retrieved at 308 for including in one or more screens as described supra. In some embodiments related to notifications such as weather or stock alerts or sports updates the entire text received for generating the notification is retrieved.

The size or length of the text retrieved at 308 is compared to the threshold size of the text that can be included in the notifications at 310. Various methodologies existing in the art or to be invented can be used to determine the length of the text at 310. For example, the length of the text can be determined based on the number of discrete characters in the text. In some embodiments, the threshold size of the text that can be accommodated within a smartwatch notification can be determined to suit the size and shape of the display screens of smartwatches generally available in the market. If the text length is less than a predetermined threshold length, the entire textual content retrieved at 308 is selected at 312 for inclusion into the notification. If the size or length of the text is greater than the predetermined threshold length, a summary of the text retrieved at 308 is generated at 314 and the summary is selected for inclusion into the notification at 312. By the way of illustration and not limitation, extractive text summaries can be generated at 314 using natural language processing algorithms currently known or to be invented in the art.

At 316 the location for the placement of the text within the resized image is identified. As described supra, machine learning techniques can be employed wherein a classifier can be trained with data sets of images and text placed within the images in a manner that does not obscure the significant image elements. In some embodiments, a classifier can be further trained to place the text within the image based on content classification as detailed further herein.

At 318 the selected text is placed at a portion of the image identified at 316 to generate a notification. For example, notifications such as a sports/weather/stock update can have a standardized format such as a background image with text on a transparent background overlaid at the center of the image. The background image can be a pre-selected background image or an image selected from a limited collection of images such as those signifying particular weather conditions or limited pool of stock symbols or indicia identifying particular sports. Notifications associated with events such as breaking news can be more dynamically composed by the server 110. This can involve analyzing the images, summarizing or shortening the text and identifying areas within the images for placement of the text in accordance with embodiments described herein.

Figure 4:
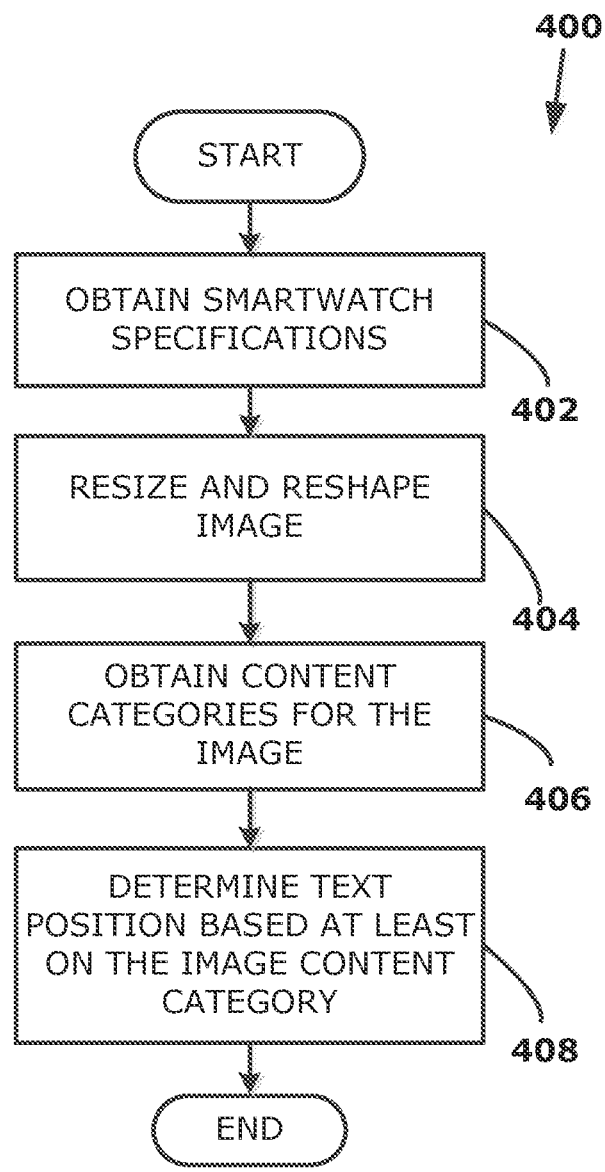
FIG. 4 is a flowchart that details a method of altering the image in accordance with embodiments described herein.

FIG. 4 is a flowchart 400 that details a method of altering the image in accordance with embodiments described herein. The method begins at 402 wherein the device specifications for a receiving client device 114 such as the smartwatch are retrieved. As mentioned supra, the server 110 retrieves the specifications for the client device 114 from one or more of the user and device profiles on the storage 140. The selected background image(s) are resized and reshaped at 404 using content-aware image resizing techniques such as seam carving to suit the hardware specifications of the client device 114. The background image can therefore be shaped as a circle, elliptical, polygonal or irregular shapes without losing the significant image elements. Portions of the background image with less important elements or minor portions of the significant image elements may be clipped as part of the resizing/reshaping process at 404. At 406 the content categories associated with the background image are obtained by using trained classifiers 228. In some embodiments, a background image may be associated with a plurality of content categories. In this case, a single content category may be identified for the image based for example, on the common content categories between the image and the text associated with the image.

The position of the text within the resized, background image is determined at 408 based at least on the image content category. If the background image is a generic image such as a football or a basketball hoop, associated with a sport score alert, the text comprising the score update can be placed at the center of the image on a transparent background with a color that contrasts with the color of the image. Similar predetermined layouts can be associated with weather updates or stock alert notifications that generally comprise short text updates. If the background image is particularly significant to the notification, such as, a photo of a personality associated with a breaking news alert, then the resized, background image is further analyzed in accordance with embodiments described herein to identify an optimal position for the text.

Figure 5:
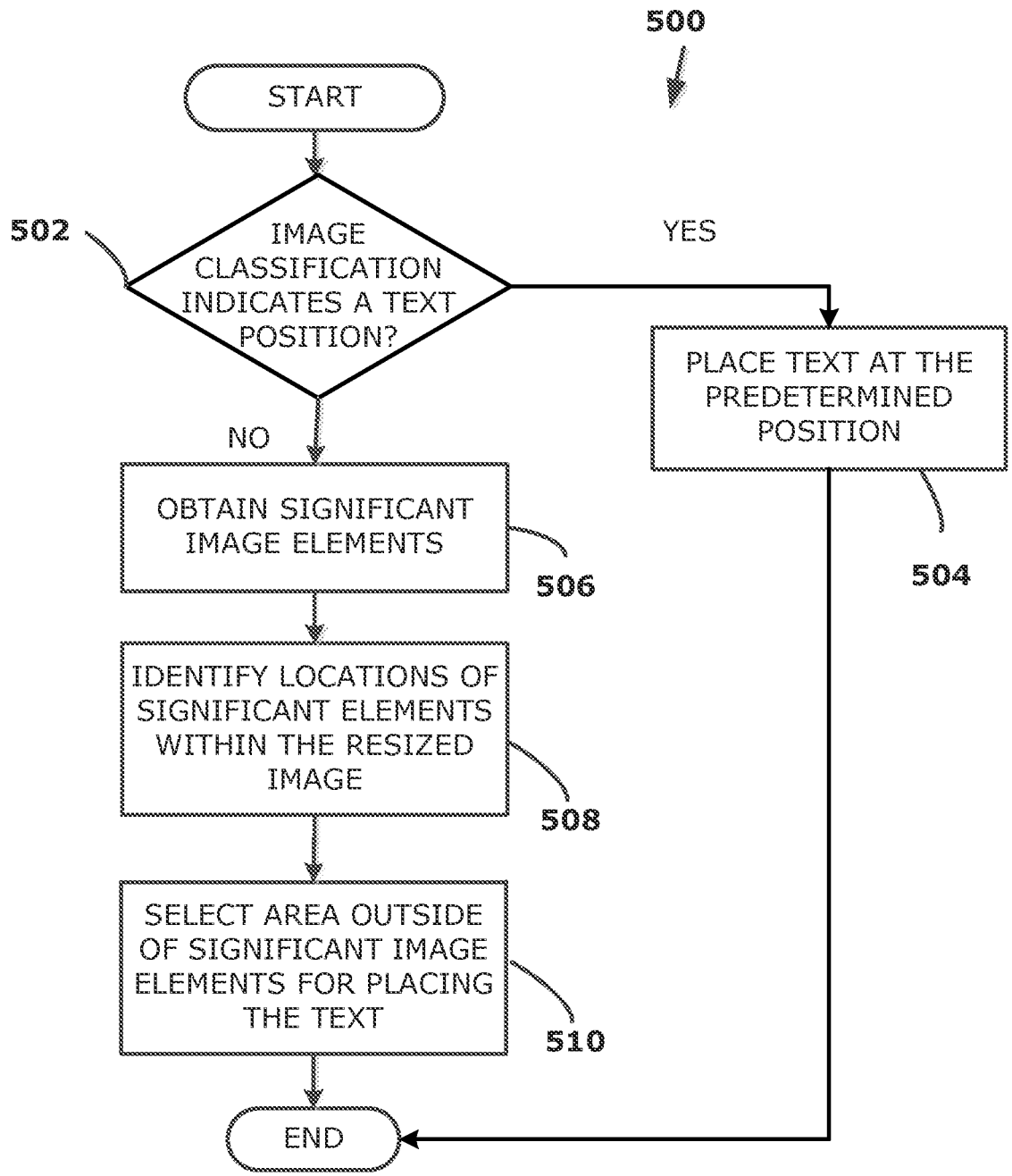
FIG. 5 is a flowchart that illustrates a method of determining a placement position for the text of a notification within a resized image in accordance with embodiments described herein.

FIG. 5 is a flowchart 500 that illustrates a method of determining a placement position for the text of a notification within a resized image in accordance with embodiments described herein. The method begins at 502 wherein it is determined if there is a predetermined position associated with the particular content category. For example, notifications for specific content categories can have associated predetermined positions within the images for placing the text. By the way of illustration and not limitation, notifications such as, sport score updates, weather updates or stock alerts that do not possess significant image data but are associated with generic images, may have their text placed at the center of the image. This facilitates the user to view the image even if the text data of the notification is more significant than the image data.

If the notification is associated with one of the above-noted content categories wherein the text data can be placed at a predetermined position, then the text data is placed at that position within the resized background image of the notification at 504 and the process is terminated. If it is determined at 502 that the notification is associated with a content category that does not have a predetermined position associated therewith, then the method proceeds to 506 wherein the resized image is analyzed to identify significant image elements. For example, notifications of content categories such as breaking news regarding a person or an incident comprise images of the person or the incident which are as important as the text data for conveying information to the user. In this case, the text data such as the title should be placed within the notification such that the significant image elements are not occluded or obscured in any manner.

Accordingly, at 508 the locations of the significant elements within the resized image are obtained. Based on the locations of the significant elements within the resized image, the areas or portions of the resized image lying outside of the significant elements can be identified at 510 as locations for placement of the text data.

Figure 6:
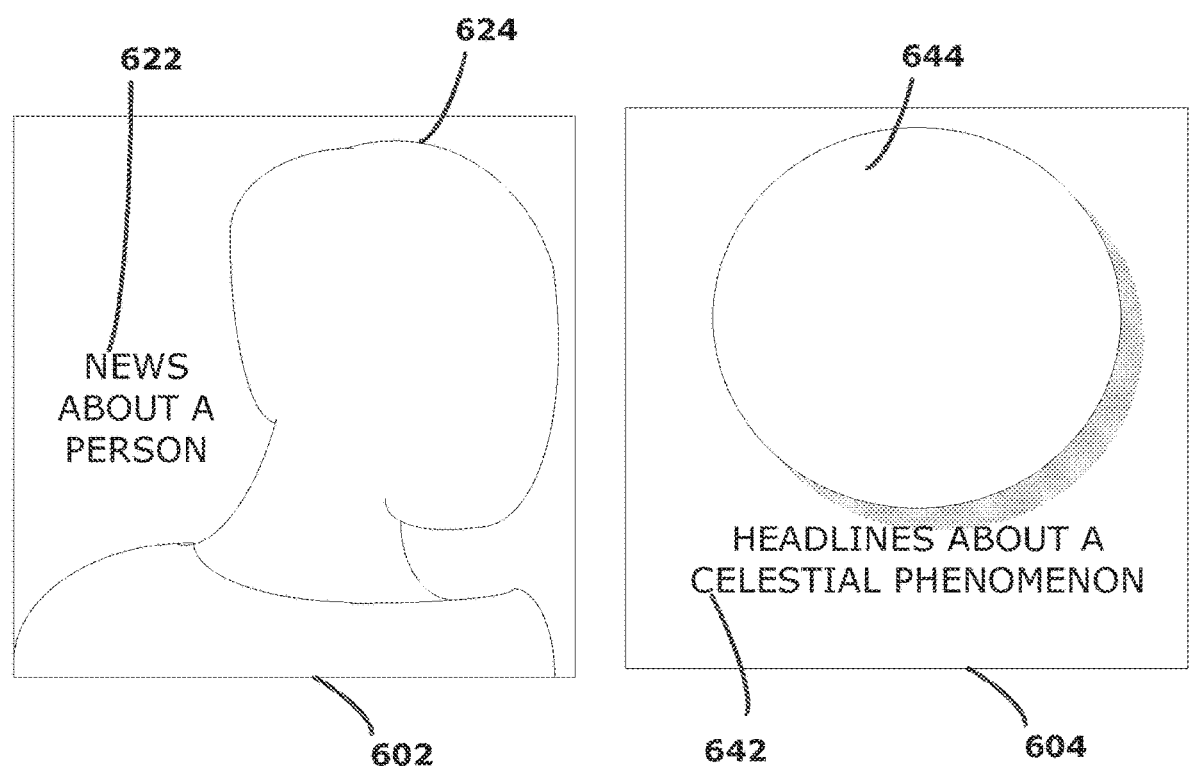
FIG. 6 is an illustration that shows two non-limiting examples of smartwatch notifications generated in accordance with embodiments described herein.

FIG. 6 is an illustration that shows two smartwatch notifications 602, 604 generated in accordance with embodiments described herein. Both the notifications are associated with headline news category. The notification 602 is associated with a personality and accordingly, it includes a title 622 with the news about the personality whose image 624 forms a significant element of the background image included in the notification 602. As seen from the notification 602, the title 622 is placed at a portion of the notification 602 that does not obscure or occlude the significant image element 624 of the person. Hence, a user viewing the notification 602 can recognize at a glance, the person and the news about the person in the notification 602.

Similarly, notification 604 which is associated with a celestial phenomenon comprises a significant image element 644 that comprises an image of the celestial body along with the title 642 that conveys the news about the celestial phenomenon. Again, the title 642 is placed at a location within the notification 604 that does not obscure the significant image element 644 in any manner. Upon comparing the notification 602 with the notification 604, it can be noted that their respective titles 622, 642 are placed at different positions that do not occlude their respective significant image elements 624 and 644. The notifications thus produced by the notification generation module 104 comprise text that is intelligently positioned within the constrained real estate of a screen of the client device 114 in a manner that conveys both the text and the image data to the user at a glance. It may be appreciated that the notifications 602, 604 can be sent in separate communications or they can be two screens incorporated into a single multi-screen notification. As the user swipes through a multi-screen notification, the notifications 602, 604 can be serially displayed.

Figure 7:
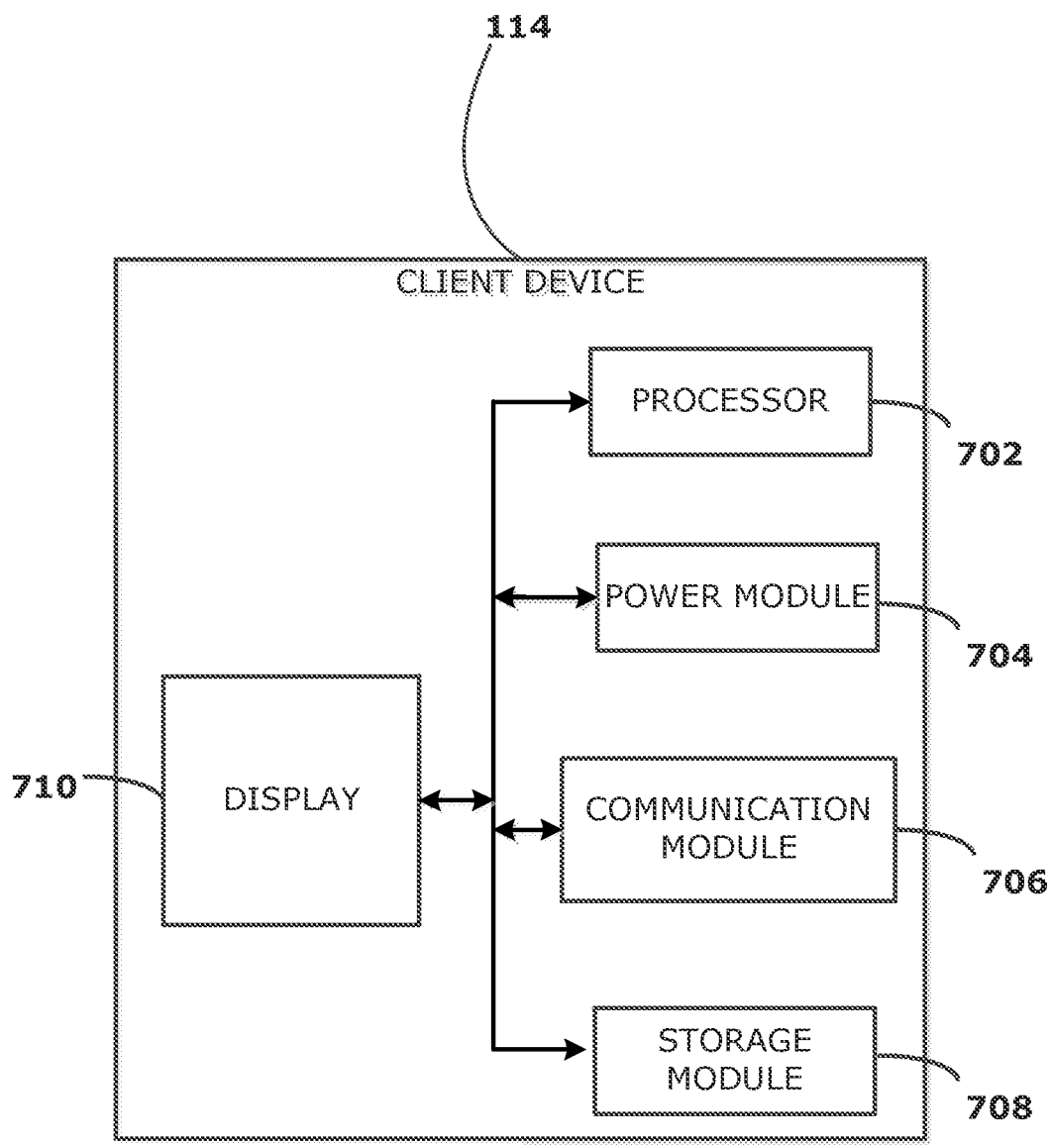
FIG. 7 illustrates a block diagram of a smartwatch in accordance with embodiments described herein.

FIG. 7 illustrates a block diagram of a smartwatch 114 in accordance with embodiments described herein. It may be appreciated that the smartwatch 114 is described herein only by the way of illustration and not limitation and that any smartwatch capable of receiving and displaying notifications can be employed in accordance with the embodiments described herein. The circuitry of the smartwatch 114 which runs on the energy from the power module 706 also comprises a processor 702, a communication module 706, a storage module 708 and a display 710. The various elements of the smartwatch 114 are communicatively coupled to each other. The processor 702 retrieves and executes instructions from the storage module 708 in order to carry out the various tasks. The storage module 708 can comprise volatile and non-volatile processor-readable storage media. Accordingly, the storage module 708 can store not only user data such as documents, images, videos but also programs executed by the processor 702 for controlling the various functions of the smartwatch. For example, instructions retrieved from the storage module 708 enable the processor to show the notifications on a display 710 in a format determined by the notification generation module 104.

The communication module 706 can be configured for wired or wireless communication with data networks for reception and transmission of data via various protocols. In some embodiments, the communication module 706 can be configured for Bluetooth communication with another client device 112 such as a smartphone or a laptop. An 'app' saved in the storage module 708 can be configured for synchronization with its corresponding 'app' on the client device 112. When the 'app' on the client device 112 is updated, notifications such as 180, 182, 602 or 604 can be forwarded to the smartphone 114 for display to the user as described herein.

Figure 8:
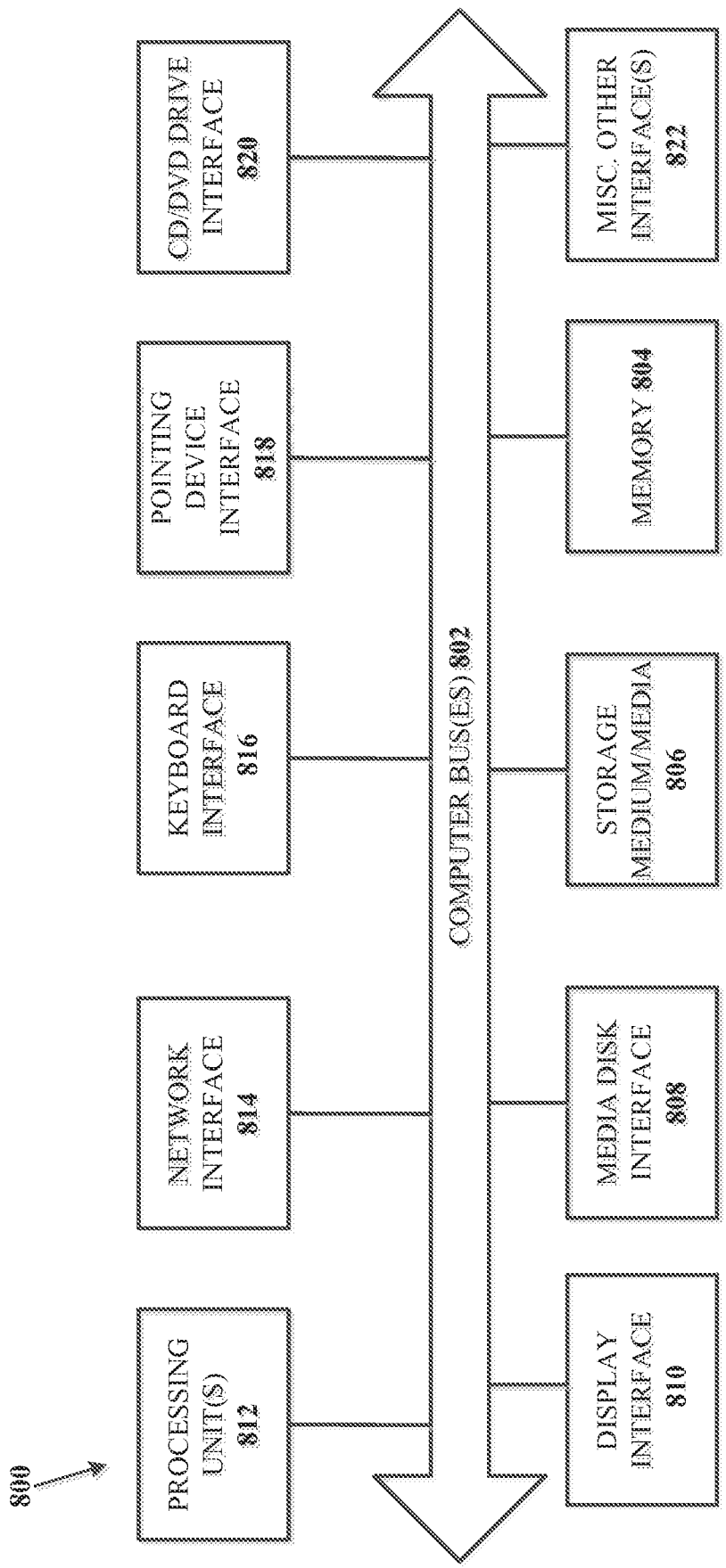
FIG. 8 illustrates internal architecture of a computing device in accordance with embodiments described herein.

FIG. 8 is a schematic diagram of the internal architecture of a computing device 800 that can be employed as a server 110 for storing and executing a notification generation module 104 in accordance with some embodiments. The computing device 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808, an interface 820 for a drive that can read and/or write to media including removable media such as floppy, CD-ROM, DVD, etc., media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code or logic, and/or computer-executable process steps, incorporating functionality described herein, e.g., one or more of process flows described herein. CPU 812 first loads computer-executable process steps or logic from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, metadata, playlists and other files. Persistent storage medium/media 806 can further include program modules/program logic in accordance with embodiments described herein and data files used to implement one or more embodiments of the present disclosure.

Figure 9:
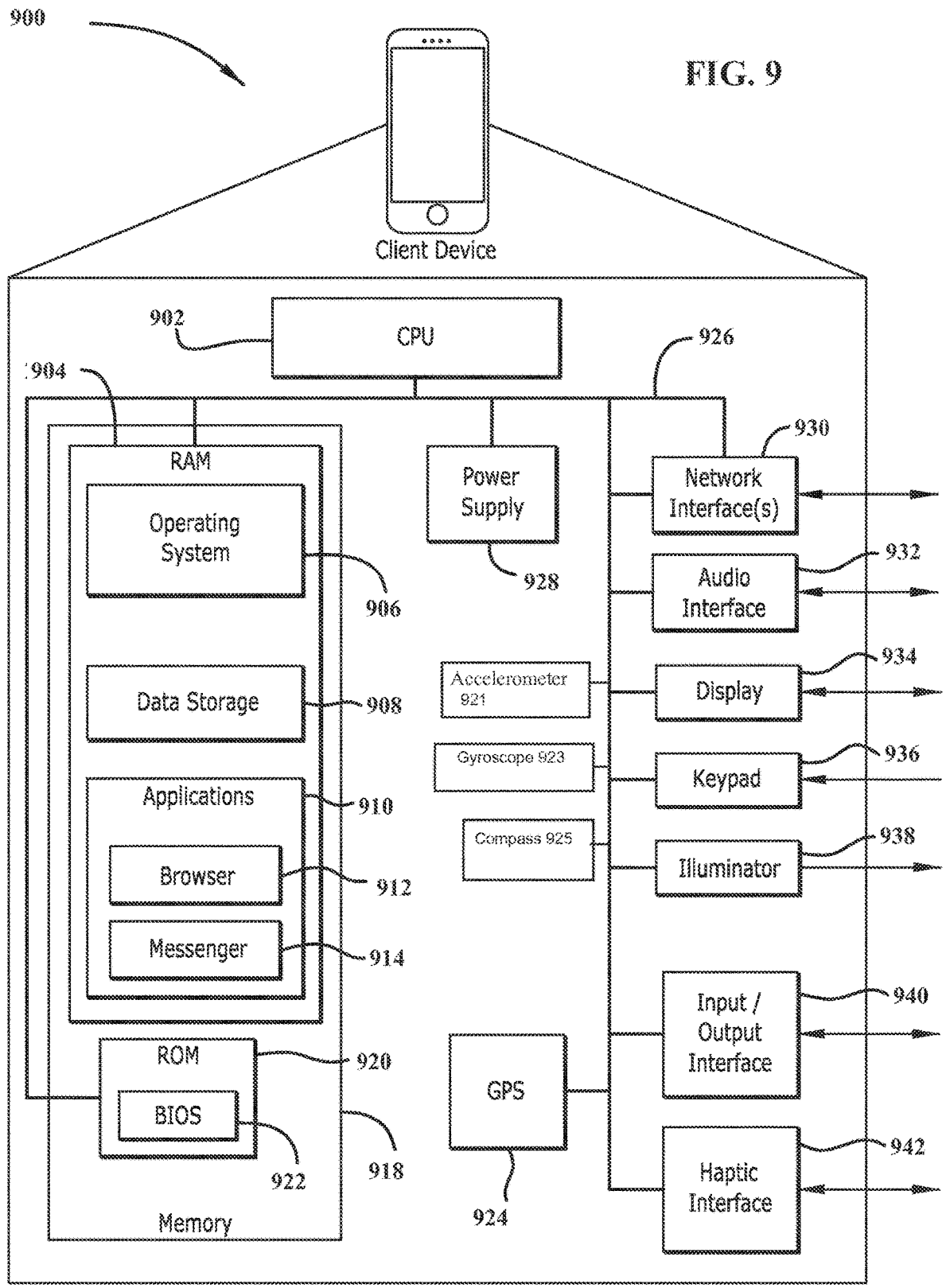
FIG. 9 is a schematic diagram illustrating a client device implementation of a computing device in accordance with embodiments of the present disclosure.

FIG. 9 is a schematic diagram illustrating a client device implementation of a computing device in accordance with embodiments of the present disclosure. For example, the client device 900 can be employed for forwarding notifications received from the server 110 to other client devices such as a smartwatch 114. The client device 900 may include a computing device capable of sending or receiving signals, such as via a wired or a wireless network, and capable of running application software or "apps" 910. A client device 900 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like.

The client device 900 can vary in terms of capabilities or features. The client device 900 can include standard components such as a CPU 902, power supply 928, a memory 918, ROM 920, BIOS 922, network interface(s) 930, audio interface 932, display 934, keypad 936, illuminator 938, I/O interface 940 interconnected via circuitry 926. Claimed subject matter is intended to cover a wide range of potential variations. For example, the keypad 936 of a cell phone may include a numeric keypad or a display 934 of limited functionality, such as a monochrome liquid crystal display (LCD) for displaying text. In contrast, however, as another example, a web-enabled client device 900 may include one or more physical or virtual keyboards 936, mass storage, one or more accelerometers 921, one or more gyroscopes 923 and a compass 925 global positioning system (GPS) 924 or other location identifying type capability, Haptic interface 942, or a display with a high degree of functionality, such as a touch-sensitive color 2D or 3D display, for example. The memory 918 can include Random Access Memory 904 including an area for data storage 908.

The client device 900 may include or may execute a variety of operating systems 906, including a personal computer operating system, such as a Windows, iOS or Linux, or a mobile operating system, such as iOS, Android, or Windows Mobile, or the like. A client device 900 may include or may execute a variety of possible applications 910, such as a client software application 914 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 900 may also include or execute an application to communicate content, such as, for example, textual content, multimedia content, or the like. A client device 900 may also include or execute an application to perform a variety of possible tasks, such as browsing 912, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more additional mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, at a computing device, an image to be forwarded to a client device;
   retrieving, by the computing device, a device specification of the client device, the device specification providing the display capabilities of the client device;
   resizing, via the computing device, the image based on the device specification;
   analyzing, via the computing device, the resized image, and based on said analysis, determining a significant element within the resized image, said significant element being a portion of the image relaying at least a context of the image;
   determining, via the computing device, textual content to be forwarded to the client device; and
   generating, via the computing device, a notification comprising the resized image and the textual content, said notification comprising the textual content situated at a location within the resized image relative to the significant element.

2. The method of claim 1, further comprising:
   analyzing said image upon said reception, and based on said analysis, determining said significant element; and
   resizing, upon performing said analysis, based on said device specification, said image.

3. The method of claim 1, wherein said display capabilities of the client device comprise a screen size and shape of a face of the client device.

4. The method of claim 1, wherein said notification comprises said resized image as a background image with said text overlaid at said location.

5. The method of claim 1, further comprising:
   analyzing said image by executing a computer vision framework; and
   determining, based on said analysis, display characteristics of said image, said display characteristics comprising RGB values of image pixels of the image and positional information of each pixel within said image.

6. The method of claim 5, wherein said determination of the significant element within the resized image is based on said determined display characteristics.

7. The method of claim 1, further comprising:
   analyzing the image by executing a classification framework; and
   determining, based on said analysis, a content category of content depicted within said image.

8. The method of claim 7, wherein said determination of the significant element within the resized image is based on said determined content category.

9. The method of claim 7, further comprising:
   generating a modified version of said textual content based on said determined content category, wherein said modified textual content is included as part of said notification.

10. The method of claim 1, wherein said client device is a smartwatch.

11. A non-transitory computer-readable storage medium tangibly encoded with computer-executable instructions, that when executed by a computing device, perform a method comprising:
    receiving, at the computing device, an image to be forwarded to a client device;
    retrieving, by the computing device, a device specification of the client device, the device specification providing the display capabilities of the client device;
    resizing, via the computing device, the image based on the device specification;
    analyzing, via the computing device, the resized image, and based on said analysis, determining a significant element within the resized image, said significant element being a portion of the image relaying at least a context of the image;
    determining, via the computing device, textual content to be forwarded to the client device; and
    generating, via the computing device, a notification comprising the resized image and the textual content, said notification comprising the textual content situated at a location within the resized image relative to the significant element.

12. The non-transitory computer-readable storage medium of claim 11, further comprising:
    analyzing said image upon said reception, and based on said analysis, determining said significant element; and
    resizing, upon performing said analysis, based on said device specification, said image.

13. The non-transitory computer-readable storage medium of claim 11, wherein said display capabilities of the client device comprise a screen size and shape of a face of the client device.

14. The non-transitory computer-readable storage medium of claim 11, wherein said notification comprises said resized image as a background image with said text overlaid at said location.

15. The non-transitory computer-readable storage medium of claim 11, further comprising:
    analyzing said image by executing a computer vision framework; and
    determining, based on said analysis, display characteristics of said image, said display characteristics comprising RGB values of image pixels of the image and positional information of each pixel within said image.

16. The non-transitory computer-readable storage medium of claim 15, wherein said determination of the significant element within the resized image is based on said determined display characteristics.

17. The non-transitory computer-readable storage medium of claim 11, further comprising:
  analyzing the image by executing a classification framework; and
  determining, based on said analysis, a content category of content depicted within said image.

18. The non-transitory computer-readable storage medium of claim 17, wherein said determination of the significant element within the resized image is based on said determined content category.

19. The non-transitory computer-readable storage medium of claim 17, further comprising:
  generating a modified version of said textual content based on said determined content category, wherein said modified textual content is included as part of said notification.

20. A computing device comprising:
  a processor; and
  a non-transitory computer-readable storage medium for tangibly storing thereon program logic for execution by the processor, the program logic comprising:
    logic executed by the processor for receiving, at the computing device, an image to be forwarded to a client device;
    logic executed by the processor for retrieving, by the computing device, a device specification of the client device, the device specification providing the display capabilities of the client device;
    logic executed by the processor for resizing, via the computing device, the image based on the device specification;
    logic executed by the processor for analyzing, via the computing device, the resized image, and based on said analysis, determining a significant element within the resized image, said significant element being a portion of the image relaying at least a context of the image;
    logic executed by the processor for determining, via the computing device, textual content to be forwarded to the client device; and
    logic executed by the processor for generating, via the computing device, a notification comprising the resized image and the textual content, said notification comprising the textual content situated at a location within the resized image relative to the significant element.

* * * * *